(12) United States Patent
Duron

(10) Patent No.: US 8,699,965 B2
(45) Date of Patent: Apr. 15, 2014

(54) LOW LOSS QUARTER WAVE RADIO FREQUENCY RELAY SWITCH APPARATUS AND METHOD

(75) Inventor: Mark W. Duron, East Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 177 days.

(21) Appl. No.: 13/306,426

(22) Filed: Nov. 29, 2011

(65) Prior Publication Data

US 2013/0135059 A1 May 30, 2013

(51) Int. Cl.
*H04B 1/46* (2006.01)
*H04B 1/44* (2006.01)

(52) U.S. Cl.
USPC ............. 455/78; 455/82; 455/83; 455/575.7; 455/107; 455/121; 455/129; 455/193.1; 455/274; 455/279.1

(58) Field of Classification Search
USPC ........... 455/78, 82, 83, 575.7, 107, 121, 129, 455/193.1, 274, 279.1
See application file for complete search history.

(56) References Cited

U.S. PATENT DOCUMENTS

| | | | |
|---|---|---|---|
| 6,356,536 B1 * | 3/2002 | Repke | 370/282 |
| 6,487,395 B1 | 11/2002 | Durec et al. | |
| 6,750,771 B1 * | 6/2004 | Brand | 340/572.7 |
| 7,411,471 B2 * | 8/2008 | Tsukahara | 333/104 |
| 2004/0259505 A1 * | 12/2004 | Vasanth | 455/78 |
| 2005/0255812 A1 | 11/2005 | Na et al. | |
| 2009/0168939 A1 * | 7/2009 | Constantinidis et al. | 375/359 |
| 2011/0128205 A1 * | 6/2011 | Rofougaran | 343/859 |

* cited by examiner

*Primary Examiner* — Wen Huang

(57) ABSTRACT

A low loss quarter wave Radio Frequency (RF) relay switch apparatus and method provides more efficient transmission of RF energy to downstream antenna switching elements in an antenna switching network. The antenna switching network may include multiple antenna multiplexer modules which are configured to operate in a local use configuration or a pass through configuration. The antenna multiplexer modules are designed for maximum efficiency in the pass through configuration acting virtually lossless when passing through RF energy.

16 Claims, 3 Drawing Sheets

LOW LOSS QUARTER WAVE RADIO FREQUENCY RELAY SWITCH APPARATUS AND METHOD

FIELD OF THE DISCLOSURE

The present disclosure relates generally to wireless antennas and, more particularly, to a low loss quarter wave Radio Frequency (RF) relay switch apparatus and method for more efficient transmission of RF energy to downstream antenna switching elements in an antenna switching network.

BACKGROUND

An antenna switching network includes antenna switches/relays which are configured to utilize RF energy locally or pass through the RF energy to one or more downstream elements including additional antenna switches/relays. An exemplary antenna switching network may include multiple antenna switches/relays in series therebetween and optionally an RF device at each of the antenna switches/relays and at an end point. The antenna switching network is configured to utilize RF energy either locally or to pass through the RF energy to a next element. In conventional embodiments, the antenna switches/relays may be realized with various components including switching devices utilized in series with a transmission line. Conventionally, such antenna switching networks are designed for maximizing local isolation at each antenna switch/relay. For example, switching devices utilized in series may result in about 0.5 to 0.75 dB in pass through loss between antenna switches/relays. Accordingly, pass through loss may accumulate greatly in an antenna switching network.

Accordingly, there is a need for a low loss quarter wave Radio Frequency (RF) relay switch apparatus and method for more efficient transmission of RF energy to downstream antenna switching elements in an antenna switching network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
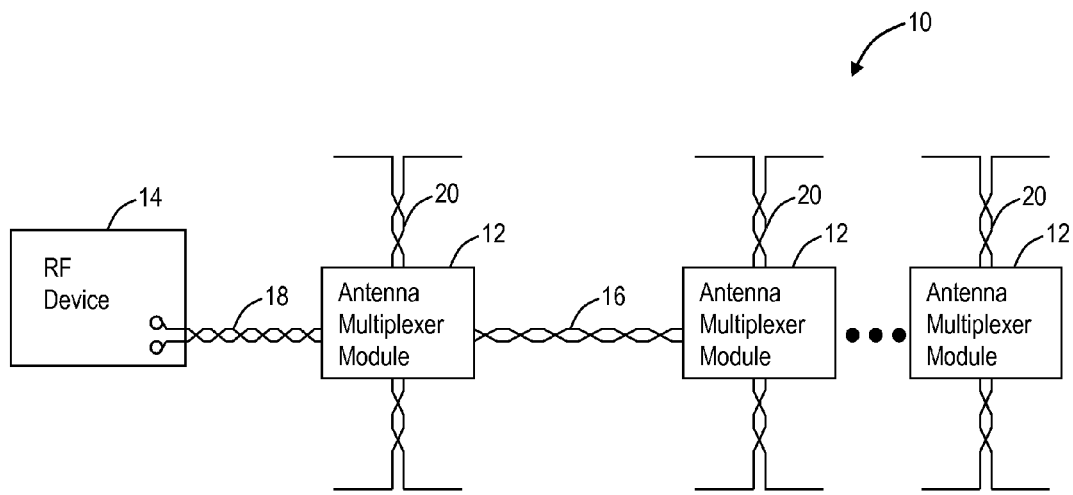
FIG. 1 is a block diagram of an antenna switching network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present disclosure provides a low loss quarter wave Radio Frequency (RF) relay switch apparatus and method for more efficient transmission of RF energy to downstream antenna switching elements in an antenna switching network. The antenna switching network may include multiple antenna multiplexer modules which are configured to operate in a local use configuration or a pass through configuration. The antenna multiplexer modules are designed for maximum efficiency in the pass through configuration acting virtually lossless when passing through RF energy.

Referring to FIGS. 1-4, in an exemplary embodiment, an antenna switching node includes an RF input 16, a pass through RF output 44 and 46, a local RF output 18; and a transmission line and switching components disposed thereon coupling the RF input to one of the pass through RF output and the local RF output, wherein the switching components are configured to pass RF energy from the RF input to the pass through RF output in a substantially lossless manner. The switching components may include an RF shorting switch positioned one fourth of a wavelength downstream from an RF power pick off point on the transmission line. The RF shorting switch may reflect in phase RF energy back towards the RF power pick off point, isolate downstream devices, and maximize the RF energy at the RF power pick off point.

The RF shorting switch may include a first switch, and the switching components may further include a second switch coupled to the transmission line and configured to one of pass through the RF energy on the transmission line or locally connect the RF energy to the local RF output. The switching components may further include conjugate reactors coupled to the transmission line, the conjugate reactors are shorted out in a local use configuration to the local RF output, and the conjugate reactors configured to neutralize capacitance on the transmission line associated with the switches when they are in the open state. The RF input, the pass through RF output, the local RF output, and the transmission line may include one of twisted pair cable, coaxial cable, microstrip, waveguide, and strip line.

The transmission line may include a first line 34 and a second line 46, and the switching components may include a first switch 36 coupled between the first line 34 and the second line 46, a second switch 38 coupled to the first line 34 and the second line 46 and to a third line 52 and a fourth line 54, the second switch 38 configured to one of pass through the first line 34 and the second line 46 and connect the first line 34 to the third line 52 and the second line 46 to the fourth line 54, and conjugate reactors 42 and 44 coupled between the first line 34 and the second line 46. The first switch 36 may be positioned approximately one quarter of a wavelength from the second switch 38.

In a pass through configuration, the first switch 36 and the second switch 38 may be configured in an open configuration and the conjugate reactors 42 and 44 may be configured to neutralize capacitance of the first switch 36 and the second switch 38, and in a local use configuration, the second switch 38 may be configured to pass the first line 48 to the third line 52 and the second line 50 to the fourth line 54 and the first switch 38 may be configured as a dead short reflecting back in a co-phase manner the RF energy on the first line 34 and the second line 46 to the second switch 38.

In another exemplary embodiment, an antenna switching network includes an RF device 14, a first antenna multiplexer module 12 coupled to the RF device 14 via a first transmission line 18, and at least one antenna multiplexer module 12 coupled to the first antenna multiplexer 12 via a second transmission line 16. The first antenna multiplexer module 12 and the at least one antenna multiplexer module are each configured to one of pass through RF energy in a substantially lossless manner and locally use RF energy. The RF device may include an RF identification (RFID) reader, and the first antenna multiplexer module and the at least one antenna multiplexer module may be each coupled to a local RFID antenna.

In yet another exemplary embodiment, a method includes receiving radio frequency (RF) energy at an input of an RF relay, the RF relay configured to operate in one of a local use configuration and a pass through configuration; in the local use configuration, switching the RF energy to a local RF output from a transmission line and reflecting back residual RF energy reflected back by a switch operating as a dead short; and in a pass through configuration, providing the RF energy from the input to an output in a substantially lossless manner and neutralizing capacitance on the transmission line from the switching with conjugate reactors.

Figure 2:
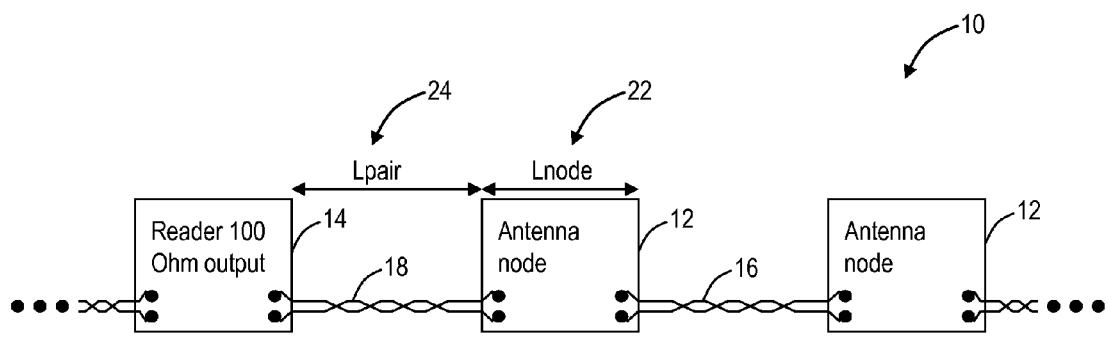
FIG. 2 is another block diagram of the antenna switching network of FIG. 1 in accordance with some embodiments.

Referring to FIGS. 1 and 2, in an exemplary embodiment, a block diagram illustrates an antenna switching network 10. The antenna switching network 10 includes a plurality of antenna multiplexer modules 12 interconnected therebetween and to an RF device 14. As described herein, the antenna multiplexer modules 12 may be referred to as antenna relays, relay switches, antenna switching nodes, antenna switching elements, RF switch, and the like referring to an RF device configured with an input and two outputs and switching components for switching between the two outputs. The antenna multiplexer modules 12 are interconnected to one another via a transmission line 16, and a last antenna multiplexer module is interconnected to the RF device 14 via a transmission line 18. There may be multiple antenna multiplexer modules 12 interconnected to one another in series through the transmission lines 16.

Operationally, the antenna multiplexer modules 12 are configured as a 1:2 switch. The antenna multiplexer module 12 may receive RF energy from a local antenna, such as connected to a transmission line 20, or from a previous antenna multiplexer module 12, and the antenna multiplexer module 12 is configured to either pass the RF energy to a next device, such as a next antenna multiplexer module 12 or the RF device 14, or to use the RF energy locally, such as over the transmission line 20. That is, the antenna multiplexer module 12 has an input, i.e. the transmission line 16 or the transmission line 20, and is configured to switch between two outputs, i.e. the transmission line 16, 18 and the transmission line 20. Again, the antenna multiplexer module 12 receives an input and switches the input for local use or for pass through. In an exemplary embodiment, the transmission lines 16, 18, 20 may include twisted pair cable as illustrated in FIGS. 1 and 2; also transmission lines 16, 18, 20 may include coaxial cable, a strip line, a microstrip, waveguide and the like. For example, the transmission lines 16, 18, 20 may include 100 Ohm twisted pair cable in one exemplary embodiment.

The antenna switching network 10 is configured to optimize pass through transmission of RF energy to downstream antenna multiplexer modules 12 and the RF device 14. For example, the antenna switching network 10 may include a low cost concept to minimize insertion loss to the RF energy passed through to the succeeding read points. With such a configuration, the antenna switching network 10 causes locally switched RF energy to suffer slightly more insertion loss while significantly reducing pass through insertion loss thereby allowing the downstream antenna multiplexer modules 12 and the RF device 14 to have more available RF power when in the pass through mode.

In an exemplary embodiment, the antenna multiplexer modules 12 may be configured for as much as 1.0 dB of loss when switching the RF energy for local use, but only about 0.3 dB of loss when passing through the RF energy to the downstream. Note, conventional designs have a minimum of 0.6 dB loss for each point (i.e., antenna multiplexer module 12) in a pass through mode.

The concept of the antenna switching network 10 includes placing RF shorting switches ¼ wave downstream from an RF power pick off point. That is, a transmission length, Lnode 22, of between RF switches and an RF pick off point in the antenna multiplexer module 12 is set approximately equal to one-quarter of a wavelength. This effectively decouples all downstream read points while maximizing the energy at the intended pick off point. It achieves this by reflecting in phase energy back towards the pick off point, isolating the downstream readers, and maximizing the energy at the pick off point. Note, a transmission length, Lpair 24, of the transmission line 16, 18 may be a variable length based on the particular application of the antenna switching network 10.

In an exemplary embodiment, the RF device 14 may include an RF identification (RFID) reader. RFID is utilized in a variety of applications with RFID readers communicating with RFID tags for purposes of identification, location, tracking, and the like. The RFID reader may be interconnected to the antenna switching network 10 and configured to receive RF energy therefrom for purpose of RFID applications. For example, the RFID reader and the antenna switching network 10 may be configured as a distributed RFID shelf reader which may also be referred to as a rollout reader. Here, the various antenna multiplexer modules 12 may be coupled to local antennas and configured for pass through of RF energy with the RF device 14. While the foregoing descriptions illustrate the antenna switching network 10 with reference to RFID, those of ordinary skill in the art will recognize the antenna switching network 10 contemplates use in a variety of additional antenna applications, and is not limited to RFID.

Figure 3:
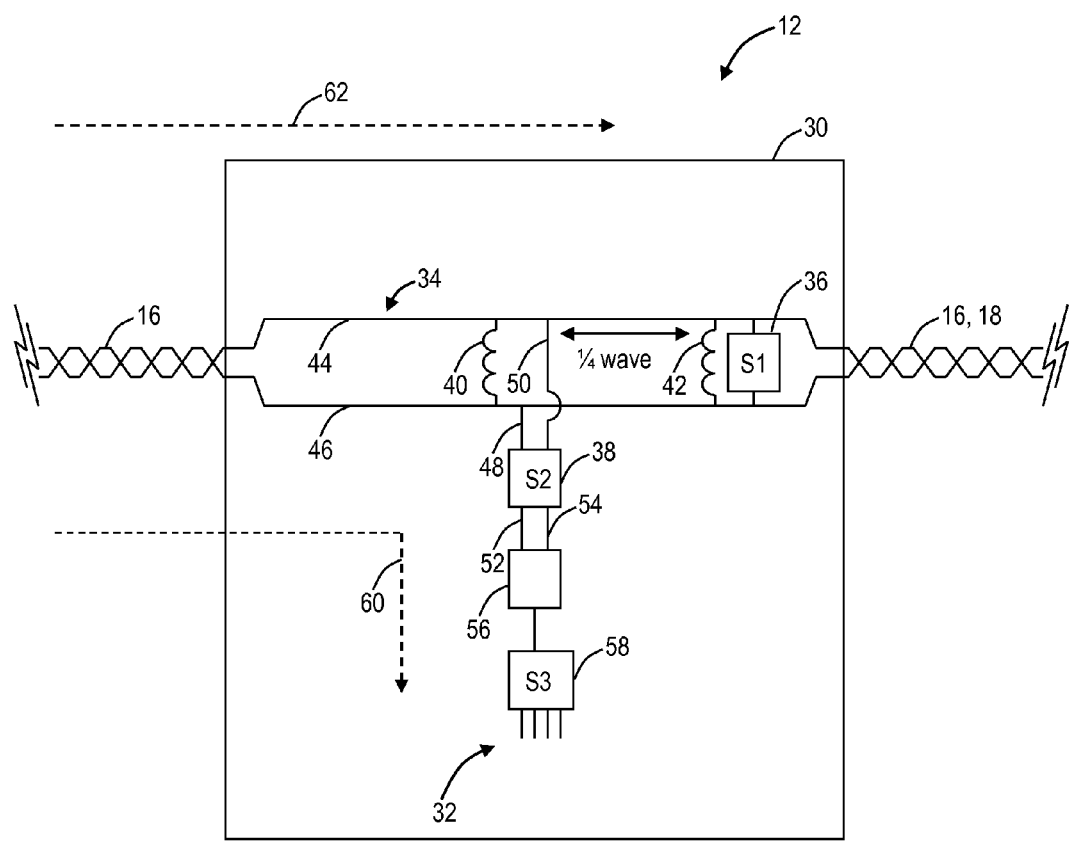
FIG. 3 is a block diagram of exemplary components in the antenna multiplexer module of the antenna switching network in accordance with some embodiments.

Referring to FIG. 3, in an exemplary embodiment, a block diagram illustrates exemplary components in the antenna multiplexer module 12. The antenna multiplexer module 12 includes an electronics device, such as a printed circuit board (PCB) 30 or the like, receiving the transmission line 16 and outputting to the transmission line 16, 18 for pass through or to local RF outputs 32 for local uses. The board 30 includes various electrical components disposed thereon and/or integrally formed therein for providing switching from the input transmission line 16 to the output transmission line 16, 18 or the local RF outputs 32.

The antenna multiplexer module 12 may include a transmission line 34 communicatively coupled between the transmission line 16 and the output transmission line 16, 18 and between the transmission line 16 and the local RF outputs 32. In an exemplary embodiment, the transmission line 34 may include a 100 Ohm co-planar pair disposed on or formed in the board 30.

The transmission line 34 includes various components connected thereto for switching between the transmission line 16, 18 and the local RF outputs 32. Specifically, the transmission line 34 may include a switch (S1) 36, a switch (S2) 38, and conjugate reactors 40, 42 coupled thereto. That is, the switch 36, the switch 38, and the conjugate reactors 40, 42 are each connected between separate lines 44, 46 of the transmission line 34. The switch 36, the switch 38, and the conjugate reactors 40, 42 are in a parallel connection with the transmission line 34.

In an exemplary embodiment, the switch 36 is a single-pole, single-throw (SPST) RF switch, i.e. a simple on-off switch. The SPST RF switch 36 is connected between the lines 44, 46. The switch 38 is a double pole, double throw (DPDT) RF switch with two lines 48, 50 each connected to one of the lines 44, 46. The DPDT RF switch 38 is a equivalent to two simple changeover switches which are configured, through a single mechanism, to either switch the lines 44, 46 in a pass through mode or locally to lines 52, 54 for connection to the local RF outputs 32.

In a local use configuration 60, the switch 38 connects the lines 44, 46 to the lines 52, 54 which connect to a balun 56. Note, direction of the RF energy through the antenna multiplexer module 12 is illustrated by arrows denoting the direction in the local use configuration 60 and in a pass through configuration 62. The switch 38 may be a shunt switch across the lines 44, 46 instead of in series with the lines 44, 46 thereby being more efficient for pass through. The balun 56 connects to a switch (S3) 58 which may include a single-pole four-throw (SP4T) switch that connects to and switches to the local RF outputs 32. The local RF outputs 32 may connect to local antennas or other circuitry and components (not shown).

In the pass through configuration 62, the switch 38 is open and/or off, i.e. configured to pass through the lines 44, 46, and the switch 36 is open. The conjugate reactors 40, 42 are configured to provide open switch neutralization, i.e. in a pass through mode where the switches 36, 38 are passing the lines 44, 46 through between the transmission line 16 and the output transmission line 16, 18. In an exemplary embodiment, a distance between the conjugate reactors 40, 42 is approximately one quarter wavelength. The conjugate reactors 40, 42 are configured to neutralize any capacitance on the lines 44, 46 caused by the switch 38. Thus, when the switch 38 is off, i.e. for a pass through, the loss is minimized and the capacitance caused by the switch 38 is neutralized by the conjugate reactors 40, 42. In an exemplary embodiment, the values and types of the conjugate reactors 40, 42 are selected to neutralize any impedance and/or capacitance caused by the switch 38 in an open state.

In the local use configuration 60, the switch 38 is configured to couple the lines 44, 46 to the lines 52, 54, and the switch 36 is closed. The conjugate reactors 40, 42 are shorted out in the local use configuration. In operation, RF energy on the lines 44, 46 divides to the switch 38 with a remainder sent to the switch 36. In the local use configuration 60, the switch 36 is a dead short that reflects back the RF energy to the switch 38 in a co-phase manner, and there may be a standing wave peak at the switch 38.

Advantageously, the antenna multiplexer module 12 is configured for less efficiency in the local use configuration 60 for significantly more efficiency in the pass through configuration 62. Specifically, the antenna multiplexer module 12 includes some downstream leakage and insertion loss of the switch 38 for the local use configuration 60. However, the switches 36, 38 and the conjugate reactors 40, 42 provide significant efficiency improvements in the pass through configuration 62.

Figure 4:
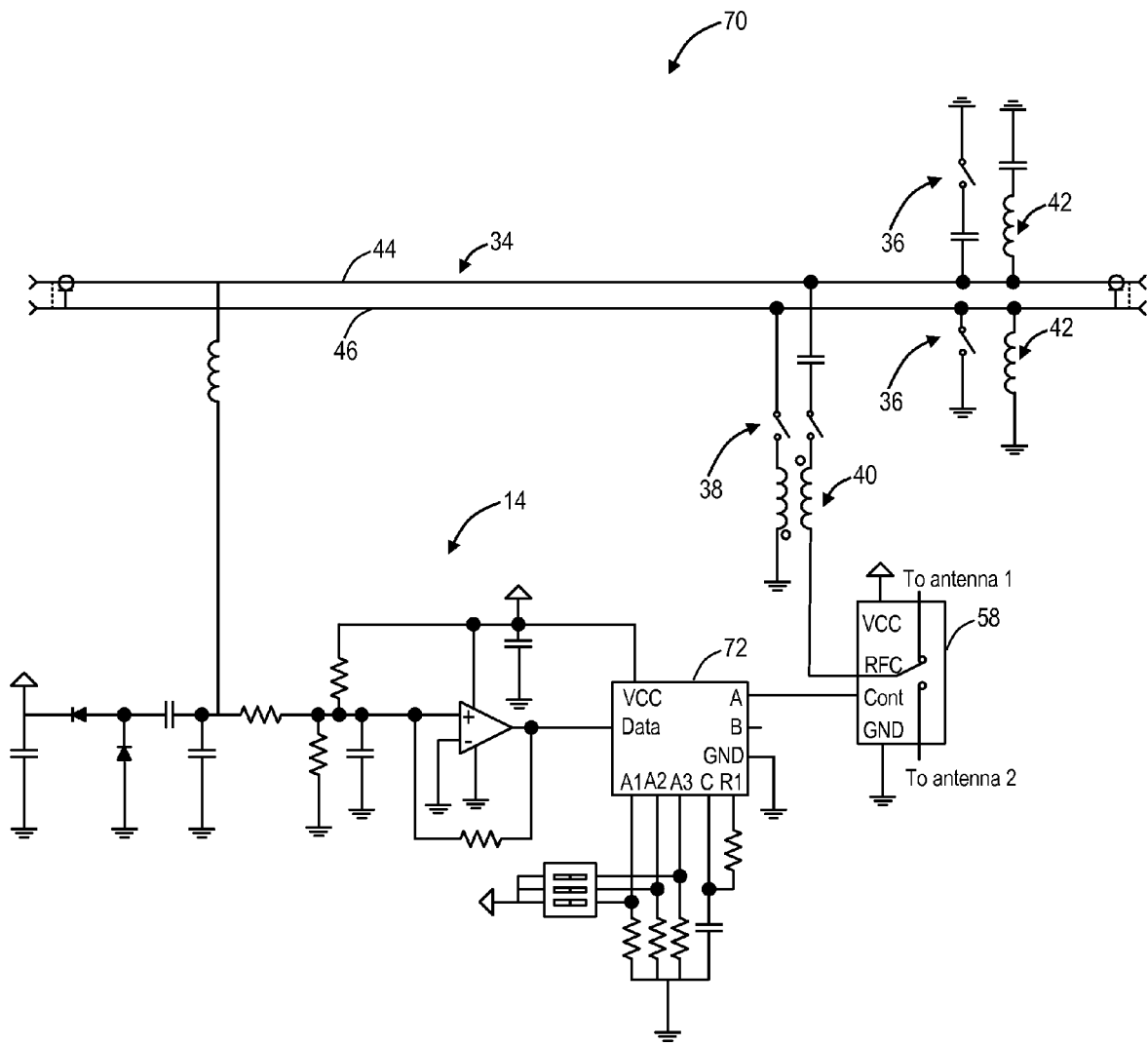
FIG. 4 is a circuit diagram of the antenna multiplexer module of the antenna switching network in an exemplary RFID application.

Referring to FIG. 4, in an exemplary embodiment, a circuit diagram illustrates an exemplary circuit 70 for the antenna multiplexer module 12 in an exemplary RFID application. Again, FIG. 4 references RFID as an exemplary embodiment of the antenna multiplexer module 12 in the antenna switching network 10. Those of ordinary skill in the art will recognize this RFID application is presented for illustration purposes, and the antenna multiplexer module 12 and the antenna switching network contemplate use in any application.

In an exemplary embodiment, RF energy and addressing data may be delivered together by the single twisted pair, i.e. the transmission line 34 formed by the lines 44, 46. Further, power may be derived from data peaks, e.g. zero cross Manchester data pulses may be used for power. Of note, the circuit 70 does not care about twisted pair polarity so the lines 44, 46 may be installed either way.

Data in the circuit 70 may be biphase balanced zero crossing data. A decoder 72 may be used to determine the correct phase of the data. The decoder may be a phase alternating line or the like. Reader to read point signaling may be done by means of the data on the transmission line 34. A constant stream of signaling data (and therefore power) is passed to all read points continuously. In an effort to minimize costs, read point to reader signaling may be achieved by voltage standing wave ratio (VSWR) reflections. Each read point may have the ability to emulate RFID tags, and to cause reflections (backscatter) back to the reader. The reader can then decode the emulated tag data, or simply measure the VSWR changes.

In the exemplary RFID application, the RF device 14 is an RFID reader. Here, the RFID reader is coupled to multiple antenna multiplexer modules 12 each having their own associated local antennas. As described herein, this may include a distributed shelf reader or a rollout reader, i.e. one RFID reader connected to multiple antennas through the antenna multiplexer modules 12. The RFID reader may include an echo canceller with a look up solution for each antenna in the system 10. The reader includes a data driver and data coupling circuits.

In an exemplary embodiment, if the RFID reader is running at a power level of +30 dBm, the antenna switching network 10 may include as many as five to seven antenna multiplexer modules 12 (depending upon twisted pair lengths) before the RF power levels become too low for reliable reading. The RFID reader may be configured to determine how far away a given read point is, the read point being a local antenna at one of the antenna multiplexer modules 12. The cable losses (dB/ft) and the read point insertion losses are known, so the RFID reader can compensate for losses up to the point it is at prescribed wireless power limits. This will cause each read point to read in a more consistent manner. The read point at the end of the line will read as well as the read point closest to the reader.

The RF shorting switches 36, 38, in the shorting mode, will cause extra loss, but only at the local level. Accordingly, the RF impedance at the switches 36, 38 is very low. This may cause a slight bit of pass through leakage in the stop or local use mode. In the pass through mode, they will be lossless. Thus, the antenna multiplexer module 12 takes a local loss, i.e. the module 12 is not as efficient in its isolation properties, a little energy will pass downstream even when used locally; but when passed downstream, it all goes downstream.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An antenna switching node, comprising:
   a radio frequency (RF) input;
   a pass through RF output;
   a local RF output; and
   a transmission line including a first line and a second line and shunt switching components including a first shunt switch and conjugate reactors coupled between the first line and the second line and a second shunt switch coupled to the first line and the second line and to a third line and a fourth line and being configured to one of pass through the first line and the second line or connect the first line to the third line and the second line to the fourth line, the switching components coupling the RF input to one of the pass through RF output and the local RF output, wherein the switching components are not connected in series with the transmission line in order to pass RF energy from the RF input to the pass through RF output in a substantially lossless manner.

2. The antenna switching node of claim 1, wherein the shunt switching components comprise an RF shorting switch positioned one fourth of a wavelength downstream from an RF power pick off point on the transmission line.

3. The antenna switching node of claim 2, wherein the RF shorting switch reflects in phase RF energy back towards the RF power pick off point, isolates downstream devices, and maximizes the RF energy at the RF power pick off point.

4. The antenna switching node of claim 2, wherein the RF shorting switch comprises a first switch, and wherein the switching components further comprise:
   a second shunt switch coupled to the transmission line and configured to one of pass through the RF energy on the transmission line and locally route the RF energy to the local RF output.

5. The antenna switching node of claim 4, wherein the switching components further comprise:
   conjugate reactors coupled to the transmission line, the conjugate reactors are shorted out in a local use configuration to the local RF output.

6. The antenna switching node of claim 1, wherein the RF input, the pass through RF output, the local RF output, and the transmission line comprise one of twisted pair cable, coaxial cable, a microstrip, waveguide, and strip line.

7. The antenna switching node of claim 1, wherein the first switch is positioned approximately one quarter of a wavelength from the second switch.

8. The antenna switching node of claim 1, wherein:
   in a pass through configuration, the first switch and the second switch are configured in an open configuration and the conjugate reactors are configured to neutralize capacitance on the first line and the second line; and in a local use configuration, the second switch is configured to pass the first line to the third line and the second line to the fourth line and the first switch is configured as a dead short reflecting back in a co-phase manner the RF energy on the first line and the second line to the second switch.

9. An antenna switching network, comprising:
a radio frequency (RF) device;
a first antenna multiplexer module coupled to the RF device via a first transmission line; and
at least one antenna multiplexer module coupled to the first antenna multiplexer via a second transmission line, wherein the first antenna multiplexer module and the at least one antenna multiplexer module each comprise:
a radio frequency (RF) input;
a pass through RF output;
a local RF output; and
each transmission line including a first line and a second line and shunt switching components including a first shunt switch and conjugate reactors coupled between the first line and the second line and a second shunt switch coupled to the first line and the second line and to a third line and a fourth line and being configured to one of pass through the first line and the second line or connect the first line to the third line and the second line to the fourth line, the switching components coupling the RF input to one of the pass through RF output and the local RF output, wherein the switching components are not connected in series with either transmission line in order to pass RF energy from the RF input to the pass through RF output in a substantially lossless manner.

10. The antenna switching network of claim 9, wherein the shunt switching components comprise an RF shorting switch positioned one fourth of a wavelength downstream from an RF power pick off point on either transmission line.

11. The antenna switching network of claim 10, wherein each RF shorting switch reflects in phase RF energy back towards the respective RF power pick off point, isolates downstream devices, and maximizes the RF energy at each RF power pick off point.

12. The antenna switching network of claim 10, wherein each RF shorting switch comprises a first switch, and wherein the shunt switching components further comprise:
a second shunt switch coupled to one of the transmission lines and configured to one of pass through the RF energy on the one of the transmission lines and locally route the RF energy to the local RF output.

13. The antenna switching network of claim 12, wherein the shunt switching components further comprise:
conjugate reactors coupled to each transmission line, the conjugate reactors are shorted out in a local use configuration to the local RF output.

14. The antenna switching network of claim 9, wherein the first switch is positioned approximately one quarter of a wavelength from the second switch.

15. The antenna switching network of claim 14, wherein:
in a pass through configuration, the first switch and the second switch are configured in an open configuration and the conjugate reactors are configured to neutralize capacitance on the first line and the second line; and
in a local use configuration, the second switch is configured to pass the first line to the third line and the second line to the fourth line and the first switch is configured as a dead short reflecting back in a co-phase manner the RF energy on the first line and the second line to the second switch.

16. The antenna switching network of claim 9, wherein the RF device comprises an RF identification (RFID) reader, and wherein the first antenna multiplexer module and the at least one antenna multiplexer module are each coupled to a local RFID antenna.

* * * * *